(12) United States Patent
Duncan

(10) Patent No.: US 7,716,130 B2
(45) Date of Patent: *May 11, 2010

(54) INVOICELESS TRADING AND SETTLEMENT METHOD AND SYSTEM

(76) Inventor: William James Duncan, 586 Hampton Street, Hampton, 3188 Victoria (AU)

( * ) Notice: Subject to any disclaimer, the term of this patent is extended or adjusted under 35 U.S.C. 154(b) by 36 days.

This patent is subject to a terminal disclaimer.

(21) Appl. No.: 11/653,306

(22) Filed: Jan. 16, 2007

(65) Prior Publication Data

US 2007/0136166 A1    Jun. 14, 2007

Related U.S. Application Data

(62) Division of application No. 09/561,990, filed on May 2, 2000, now Pat. No. 7,266,525.

(51) Int. Cl.
*G06Q 40/00* (2006.01)
(52) U.S. Cl. .................................................... 705/40
(58) Field of Classification Search ................ 705/35
See application file for complete search history.

(56) References Cited

U.S. PATENT DOCUMENTS

| | | | |
|---|---|---|---|
| 4,713,761 A | 12/1987 | Sharpe et al. | |
| 4,799,156 A * | 1/1989 | Shavit et al. | ................ 705/26 |
| 4,812,628 A | 3/1989 | Boston et al. | |
| 4,941,090 A | 7/1990 | McCarthy | |
| 4,947,028 A | 8/1990 | Gorog | |
| 5,025,372 A | 6/1991 | Burton et al. | |
| 5,117,355 A | 5/1992 | McCarthy | |
| 5,202,826 A | 4/1993 | McCarthy | |
| 5,222,018 A | 6/1993 | Sharpe et al. | |

(Continued)

FOREIGN PATENT DOCUMENTS

EP   0 308 224 A2   2/1998

(Continued)

OTHER PUBLICATIONS

The Business Journal of Phoenix, Dec. 124, 1999, (author unknown), pp. 1-4 Cash-flow tips that could keep business afloat.*

(Continued)

*Primary Examiner*—Alexander Kalinowski
*Assistant Examiner*—Bruce I Ebersman
(74) *Attorney, Agent, or Firm*—Paul E Schaafsma; Amy L. Pearson

(57) ABSTRACT

Methods and systems consistent with the present invention overcome the shortcomings of existing trading systems by providing an invoiceless trading system that creates incentives for customers to pay suppliers within a predetermined period of time, such as a settlement period. Specifically, the invoiceless trading system enables a customer to obtain a discount on orders placed with suppliers in return for an immediate payment (e.g., within 24 hours) by the customer. The supplier receives payment within the predetermined period of time, and the customer receives additional cash benefits by providing an early payment to the supplier. To communicate with and transfer funds between customers and suppliers, the invoiceless trading system may use an electronic gateway and a settlement bank. In addition to creating an incentive to embrace e-commerce, both customers and suppliers avoid the need to manually process orders and use invoices to complete transactions.

23 Claims, 6 Drawing Sheets

U.S. PATENT DOCUMENTS

| | | | |
|---|---|---|---|
| 5,287,268 A | | 2/1994 | McCarthy |
| 5,291,396 A | | 3/1994 | Calcerano et al. |
| 5,293,310 A | | 3/1994 | Carroll et al. |
| 5,362,948 A | | 11/1994 | Morimoto |
| 5,483,445 A | | 1/1996 | Pickering |
| 5,550,734 A | * | 8/1996 | Tarter et al. .................... 705/2 |
| 5,671,279 A | | 9/1997 | Elgamal |
| 5,684,965 A | | 11/1997 | Pickering |
| 5,710,887 A | * | 1/1998 | Chelliah et al. .............. 705/26 |
| 5,717,989 A | | 2/1998 | Tozzoli et al. |
| 5,732,400 A | | 3/1998 | Mandler et al. |
| 5,734,838 A | | 3/1998 | Robinson et al. |
| 5,740,427 A | * | 4/1998 | Stoller ...................... 707/104.1 |
| 5,757,917 A | | 5/1998 | Rose et al. |
| 5,758,328 A | | 5/1998 | Giovannoli |
| 5,758,329 A | * | 5/1998 | Wojcik et al. ................. 705/28 |
| 5,794,207 A | * | 8/1998 | Walker et al. .................. 705/1 |
| 5,794,221 A | * | 8/1998 | Egendorf ..................... 705/40 |
| 5,801,365 A | | 9/1998 | Katz |
| 5,802,497 A | | 9/1998 | Manasse |
| 5,825,881 A | | 10/1998 | Colvin, Sr. |
| 5,870,724 A | | 2/1999 | Lawlor et al. |
| 5,920,847 A | * | 7/1999 | Kolling et al. ................ 705/40 |
| 5,933,817 A | * | 8/1999 | Hucal .......................... 705/39 |
| 5,970,475 A | * | 10/1999 | Barnes et al. ................. 705/27 |
| 5,974,207 A | * | 10/1999 | Aksyuk et al. ................ 385/24 |
| 6,006,199 A | * | 12/1999 | Berlin et al. .................. 705/26 |
| 6,014,635 A | * | 1/2000 | Harris et al. ............. 705/14.17 |
| 6,061,660 A | | 5/2000 | Eggleston et al. |
| 6,078,104 A | * | 6/2000 | Sakurai ....................... 257/738 |
| 6,081,790 A | * | 6/2000 | Rosen ......................... 705/40 |
| 6,167,378 A | * | 12/2000 | Webber, Jr. .................... 705/8 |
| 6,167,385 A | * | 12/2000 | Hartley-Urquhart .......... 705/35 |
| 6,233,565 B1 | * | 5/2001 | Lewis et al. ................... 705/35 |
| 7,069,234 B1 | * | 6/2006 | Cornelius et al. ............. 705/26 |
| 7,165,174 B1 | * | 1/2007 | Ginter et al. ................ 713/153 |
| 7,340,433 B1 | * | 3/2008 | Kay et al. ..................... 705/38 |
| 2001/0051919 A1 | | 12/2001 | Mason |
| 2006/0178918 A1 | * | 8/2006 | Mikurak ........................ 705/7 |
| 2006/0248016 A1 | * | 11/2006 | Ginter et al. .................. 705/54 |

FOREIGN PATENT DOCUMENTS

| | | |
|---|---|---|
| JP | 11149503 A | 6/1999 |
| WO | WO 98/14921 A1 | 4/1998 |
| WO | WO 98/28699 | 7/1998 |
| WO | WO 00/67167 | 11/2000 |

OTHER PUBLICATIONS

EDI is Habit-Forming for RJR Tobacco, Stephanie Stahl, Jan. 111, 1993, 2 pages.*

Minting Electronic Cash IEEEE Spectrum, vol. 34, No. 2, pp. 30-34, Chaum. D. Brands. Feb. 1997.*

Electronic Banking Services for the Financial Community M. Wood, pp. 21-32, 1984.*

Prime Revenue: "Supply Chain Finance Flexible, Robust Solutions," from http://www.primerevenue.com/what/products/supply.html printed on Feb. 9, 2006.

Sirbu, Marvin et al., "NetBill: An internet Commerce System Optimized for Network-Delivered Services", IEEE Personal Communications, Aug. 1995, pp. 34-39.

Nicos et al., Pay and Save, Accountancy, Jun. 1999, vol. 123, Issue 1270, p. 92.

New Ways with the Old Bill, Corporate Finance, Sep. 2000, Issue 190, p. 10.

Glassanos, When Less is More: Rethinking the Accounts Payable Balance, AFP Exchange, May/Jun. 2003, vol. 23, Issue 3, p. 30.

* cited by examiner

INVOICELESS TRADING AND SETTLEMENT METHOD AND SYSTEM

RELATED APPLICATION

This application is a divisional of and claims benefit of priority from application Ser. No. 09/561,990, filed May 2, 2000, which was allowed Oct. 18, 2006 now U.S. Pat. No. 7,266,525 which is incorporated herein by reference.

BACKGROUND OF THE INVENTION

A. Field of the Invention

This invention relates generally to data processing systems, and more particularly, to electronic trading and settlement systems.

B. Description of the Related Art

Conventional trading and settlement systems generally involve large corporate customers, commercial suppliers, and large financial institutions (e.g., settlement banks). These systems trade using large amounts of paper. That is, conventional trading and settlement systems create "paper trails" that serve to lengthen a business transaction from the initial order to the final payment.

For example, a customer may place an order (e.g., a purchase order) with a supplier. Once the supplier receives the order, the supplier creates a packing slip, and ships the order to the customer. With the shipment of the order, the supplier includes an invoice for the order. The invoice generally requires payment within a standard time period set by the supplier (e.g., 30 days). In practice, however, many customers may take up to 60 days to settle their outstanding accounts with suppliers. Thus, it may take over two months from the time a customer places an order and it is shipped to the time the supplier receives a payment. Aside from the reduced cash flow and/or credit risk born by the supplier before receipt of payment, the customer must process (either manually or electronically) each invoice and account with the supplier.

In response to the inherent problems with conventional trading and settlement systems, more and more suppliers and/or customers are switching to the Internet, and trading and settling "online." That is, systems such as supply side trading systems that use normal trading terms (e.g., remit payment 30 days) offered by business solution firms, such as ORACLE, COMMERCE ONE, or ARIBA.

Although these electronic trading and settlement systems create an electronic marketplace that enables both customers and suppliers to trade online, the trading system does so at a high price. That is, unless all parties (e.g., customers, suppliers, settlement banks) are "wired," the benefits of electronic trading and settling is not realized. In other words, it may be that the customer has built a large infrastructure capable of complete automated ordering, however, unless the supplier has reciprocal functionality, the customer must resort to more conventional ordering (e.g., paper purchase orders) to engage the supplier. Although the benefits are obvious, nevertheless, both customers and suppliers have been slow to adopt electronic trading and settling. Thus, there is a need to for a system that encourages both suppliers and customers to adopt electronic trading and settlement capabilities.

Therefore, there exists a need to improve existing trading and settlement systems by enabling electronic invoiceless trading and settlement systems that provide incentives for both customers and suppliers to trade and settle electronically. Such a system should not only offer a tangible incentive to both customers and suppliers, but also it should place little to no risk on the settlement bank.

SUMMARY OF THE INVENTION

Methods and systems consistent with the present invention overcome the shortcomings of existing trading systems by providing an invoiceless trading system that creates incentives for customers to pay suppliers within a predetermined period of time, such as a settlement period. Specifically, the invoiceless trading system enables a customer to obtain a discount on orders placed with suppliers in return for an immediate payment (e.g., within 24 hours) by the customer. The supplier receives payment within the predetermined period of time, and the customer receives additional cash benefits by providing an early payment to the supplier. To communicate with and transfer funds between customers and suppliers, the invoiceless trading system may use an electronic gateway and a settlement bank. In addition to creating an incentive to embrace e-commerce, both customers and suppliers avoid the need to manually process orders and use invoices to complete transactions.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1A:
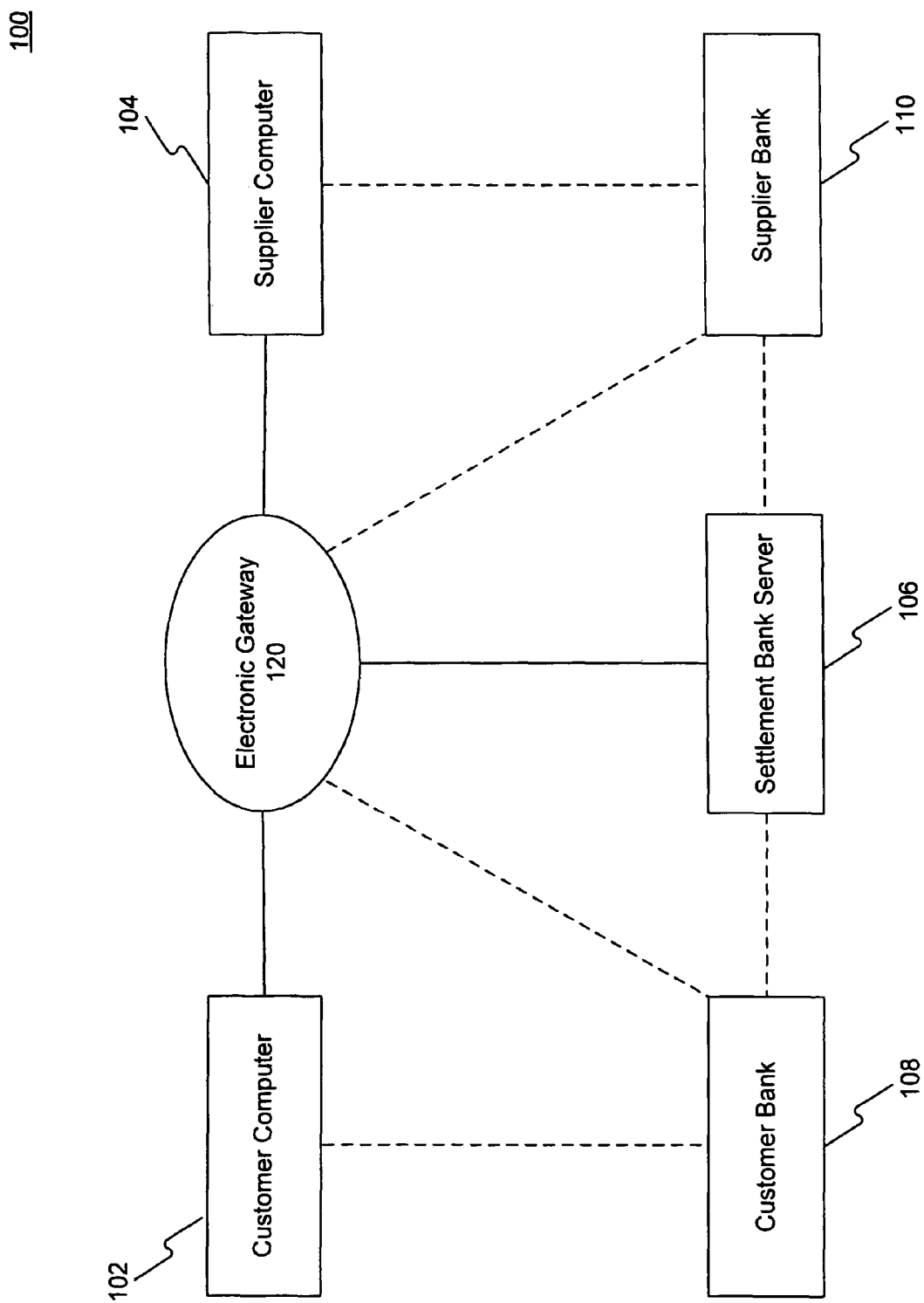
FIG. 1A depicts an invoiceless trading system suitable for practicing methods and systems consistent with the present invention.

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Overview

Methods and systems consistent with the present invention provide an invoiceless trading system that provides incentives for customers to pay suppliers within a predetermined period of time, such as a settlement period. The customer and supplier prenegotiate an incentive amount to apply to each order. The invoiceless trading system draws an amount equivalent to the full face value of an order placed by the customer and filled by the supplier from a bank account associated with the customer. Periodically, the trading system rebates to the customer the prenegotiated amount. Such methods and systems provide discounts as an incentive to the customer so that the customer pays the supplier within a predetermined settlement period (e.g., one day).

The invoiceless trading and settlement system comprises a number of components, such as a customer bank, a settlement bank, a supplier bank, and an electronic gateway connecting a customer and a supplier.

A customer (e.g., corporation or governmental entity) places an order using an electronic gateway to purchase products from a supplier. Products are broadly defined as commodities, services, physical objects or goods, or any other item a supplier might sell to a customer. An order may be an electronic message delivered in any well-known financial communications format, such as HTTP, FTP, EDI, SMTP.

A supplier offers products to a plurality of customers. To entice the customer to promptly pay within a settlement date, the supplier offers an incentive to the customer, such as discounts, bonuses, prizes, and the like. To ensure accuracy of an order, the supplier immediately transmits an electronic message to the customer using the electronic gateway. A supplier may fill customer orders by any traditional means. For example, the supplier may "scan-pack" (described below). In addition to scan-packing, the supplier may transmit an electronic confirmation message (e.g., Advanced Shipping Notice, ASN) to the customer using the electronic gateway. The ASN is further described below.

A settlement bank, such as a corporate bank or any similar financial institution, pays the supplier at a time agreed in advance between the customer and the supplier. Once a customer transmits an authorization to the settlement bank to pay the supplier through the electronic gateway, the settlement bank lodges cleared funds for a specified amount (e.g., a discounted amount) in a supplier's bank. Cleared funds may be obtained from a customer's bank as a loan to the customer, withdrawal from a customer's deposit account, or the like.

An electronic gateway may be an independent entity or specific to the type of products being bought and sold. For example, in the case of a private network, an electronic gateway may include an administrator that exchanges, logs and translates messages between subscribing customers and subscribing suppliers. In the case of an open network, the electronic gateway may be the Internet. To provide security in an open network, a firewall or VPN may be used when connecting the customer, supplier, their respective banks, and the settlement bank. In addition, the electronic gateway may include translation, logging, and forwarding services to ensure the accuracy of all orders, payments, and notices. An example of an electronic gateway suitable for practicing methods and systems consistent with the present invention is the AT&T INTERCOMMERCE gateway, available from AT&T.

Invoiceless trading systems provide a number of benefits over traditional trading and settlement systems. First, invoiceless trading systems provide both customers and suppliers a tangible incentive to embrace e-commerce. Customers can generate additional profits by receiving a cash benefit for improving the cashflow to the supplier by authorizing the settlement bank to transfer an early payment to a supplier's bank accounts. The supplier may receive payment of an outstanding customer account within a short period, such as one business day of the settlement bank receiving instructions from the customer to settle the account.

Second, invoiceless trading systems significantly reduce the cost associated with supply chain trading for both customer and suppliers. By using an electronic gateway, not only does a supplier not have to produce invoices, followup on outstanding accounts, or process payments, but also the supplier can almost instantly receive funds since the settlement bank directly deposits the funds into the supplier's bank. Moreover, remittance advice can automatically be lodged into the supplier's accounting software. Customers may have access to electronic catalogs located on a supplier's system, and the customer may also receive automated and immediate confirmation of shipment.

Finally, the invoiceless trading system creates additional profits for both suppliers and customers. That is, the customer's balance sheet is used to generate additional profits for the customer through supplier discounts. It is the strength of the customer's balance sheet that enables suppliers to receive immediate payment and therefore have the incentive to use the invoiceless trading system. The customer's balance sheet is not adversely affected by paying its suppliers early as borrowed funds are used to discharge trade creditors, thus canceling out the additional liability of the borrowing. Thus, the balance sheet improves marginally as the net borrowing is less than the face value of the trade creditors discharged.

Moreover, the invoiceless trading system creates additional profits for the customer by providing a rebate from the settlement bank. Since the customer is generally a larger and stronger party than the supplier, the customer has a lower cost of funds. Thus, the difference between the cost and availability of funds to the customer and supplier largely determine the size of the supplier incentive (discount), and therefore the size of the rebate from the settlement bank. As part of their incentive from the supplier, the customer receives a rebate from the settlement bank based on the strength of the customer's balance sheet and credit rating.

System Components

FIG. 1A depicts an exemplary invoiceless trading system 100 suitable for practicing methods and systems consistent with the present invention. Invoiceless trading system 100 comprises a customer computer 102, a supplier computer 104, and a settlement bank server 106, all connected via an electronic gateway 120, such as the Internet. Also included in invoiceless trading system 100 are a customer bank computer 108 and a supplier bank computer 110. Bank computers 108, 110 may be directly connected to bank server 106, directly connected to customer 102 and supplier 104, or connected to both through electronic gateway 120. A customer may use customer computer 102 to place an order with a supplier for products. A supplier may use supplier computer 104 to receive and process orders and electronically transmit shipping notices to a customer computer 102. Although only one customer computer 102, and supplier computer 104 are depicted in system 100, one skilled in the art will appreciate that many more customers' and/or suppliers' computers may be connected into system 100.

Figure 1B:
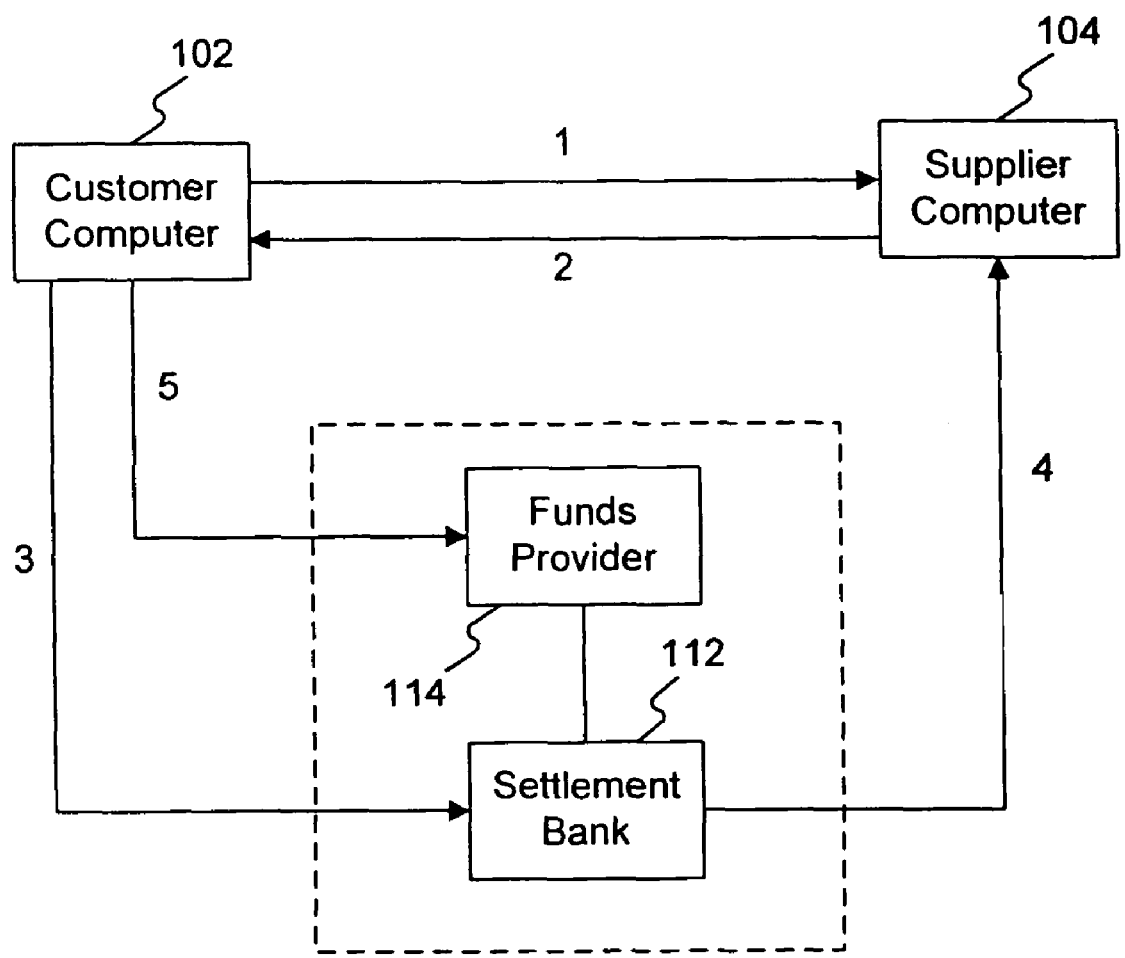
FIG. 1B depicts another embodiment of an invoiceless trading system suitable for practicing methods and systems consistent with the present invention.

FIG. 1B depicts another exemplary invoiceless trading system 150 for practicing methods and systems consistent with the present invention. Invoiceless trading system 150 comprises customer computer 102, supplier computer 104, a settlement bank 112, and a funds provider 114. In system 150, customer 102 may obtain an early payment discount for an order from supplier 104 by paying the supplier by a funds provider 114 via a settlement bank 112. In one embodiment, customer 102 may establish a settlement bank agreement with settlement bank 112 for settling orders placed by customer 102 by paying suppliers using funds provided by the funds provider 114. Customer 102 may also establish a funding agreement with funds provider 114, including, for example, a service fee and a rate of interest to be paid by customer 102 to funds provider 114. When customer 102 transmits an order message to supplier 104 with an order for an item, the customer 102 may then receive a shipping notification from supplier 104 indicating that the order has been filled. After the shipping notification is received by customer 102 from supplier 104, customer 102 may transmit a payment message to settlement bank 112 to make a discounted payment to supplier 104 for the order on a first date using funds from funds provider 114. In one example, the discounted payment may be equal to a cost for the order less an early payment discount agreed upon between customer 102 and supplier 104 based on supplier 104 receiving payments for the order within a predetermined period of time. After the first date, customer 102 may pay a negotiated payment, e.g., equal to the discounted payment plus the service fee and an interest amount, to funds provider 114. For example, the interest rate may be calculated based on a time period between the first date and the date on which the customer pays funds provider 114.

Figure 2A:
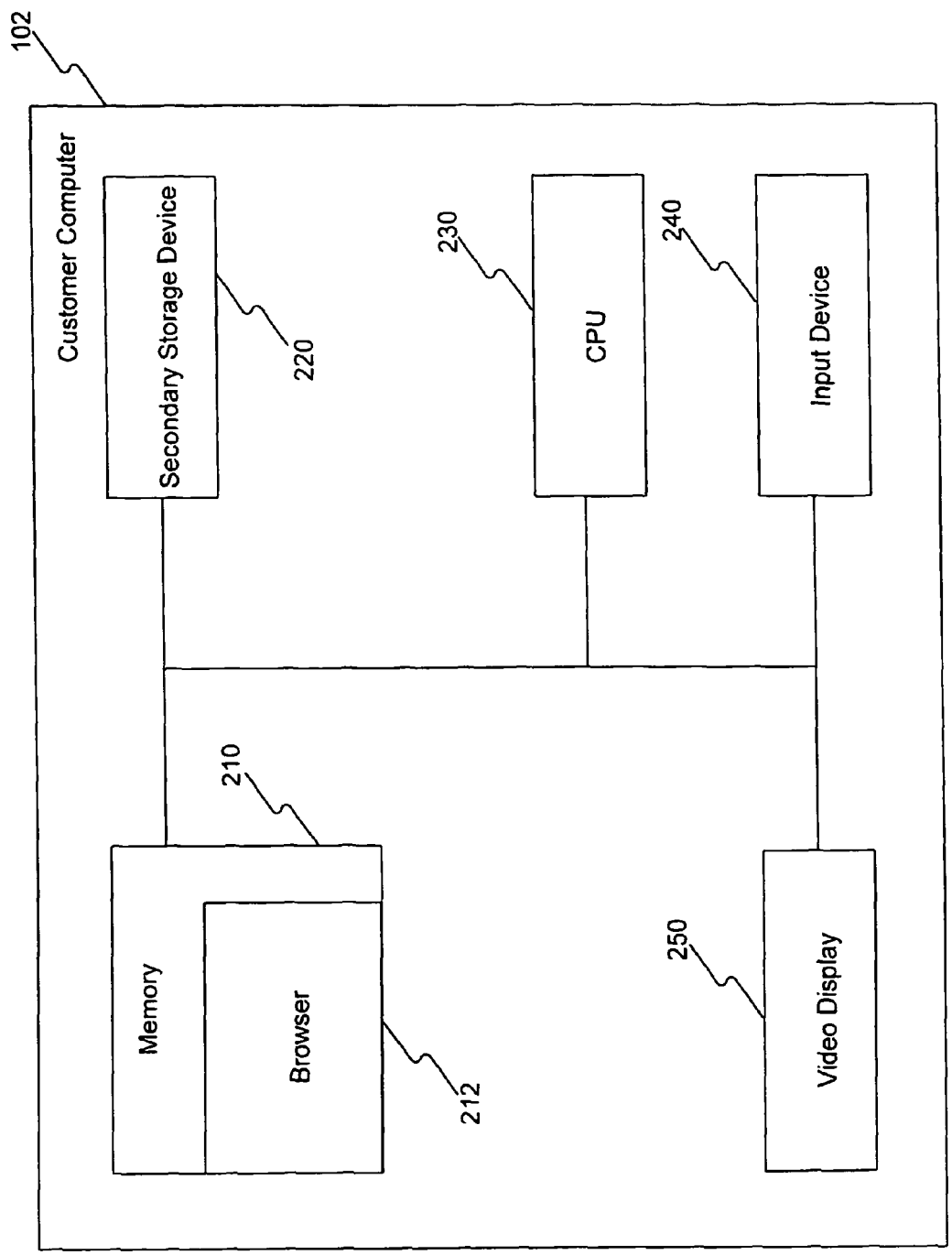
FIG. 2A depicts a more detailed diagram of the customer computer depicted in FIG. 1.

FIG. 2A depicts a more detailed diagram of customer computer 102, which contains a memory 210, a secondary storage device 220, a central processing unit (CPU) 230, an input device 240, and a video display 250. Memory 210 includes browser 212 that allows customers to interact with computer 104 and banks 106, 108 by transmitting and receiving files, such as Web pages. A Web page may include images or textual information to provide an interface to receive requests for products from a user using hypertext markup language (HTML), Java or other techniques. Examples of browsers suitable for use with methods and systems consistent with the present invention are the Netscape Navigator browser, from Netscape Communications Corp., and the Internet Explorer browser, from Microsoft Corp.

Figure 2B:
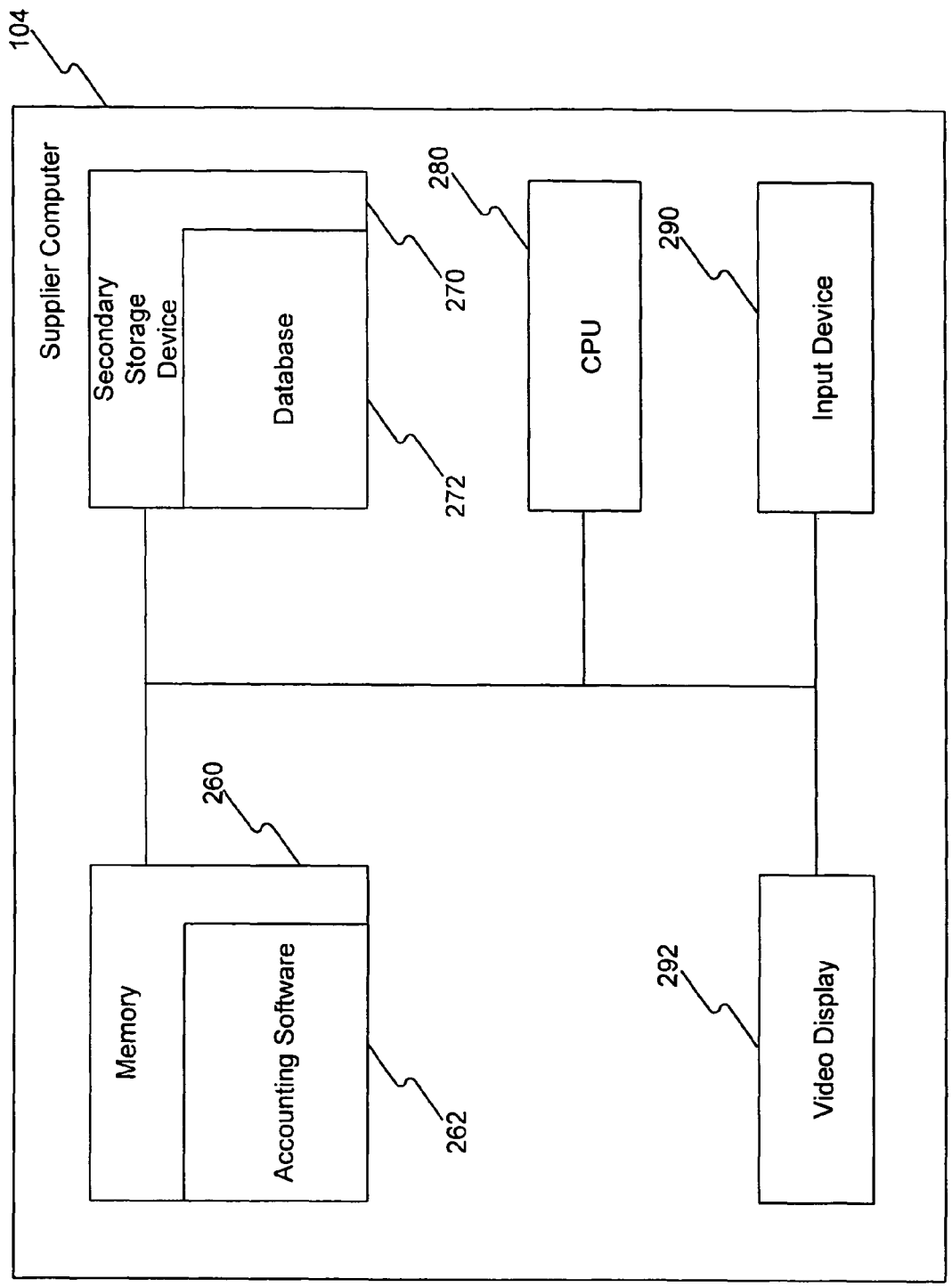
FIG. 2B depicts a more detailed diagram of the supplier computer depicted in FIG. 1.

As shown in FIG. 2B, supplier computer 104 includes a memory 260, a secondary storage device 270, a CPU 280, an input device 290, and a video display 292. Memory 260 includes accounting software 262 that processes received orders and creates ASNs for the customer. An ASN is a message sent to a customer upon shipment of goods. In addition, accounting software 262 contains a user interface (not shown) to communicate with computer 102 and bank servers 106, 110. The user interface may be a Web page, Application Program Interface (API), e-mail program, or other input interface. An API is a set of routines, protocols, or tools for communicating with software applications. APIs provide efficient access to accounting software 262 without the need for additional software to interface with the software. Web software, such as the APACHE Web software, or e-mail program, such as the Sendmail e-mail software, may also be included as a user interface to transmit and receive information. Secondary storage device 270 contains a database 272 that contains information relating to accounts receivables and accounts payables.

Figure 3:
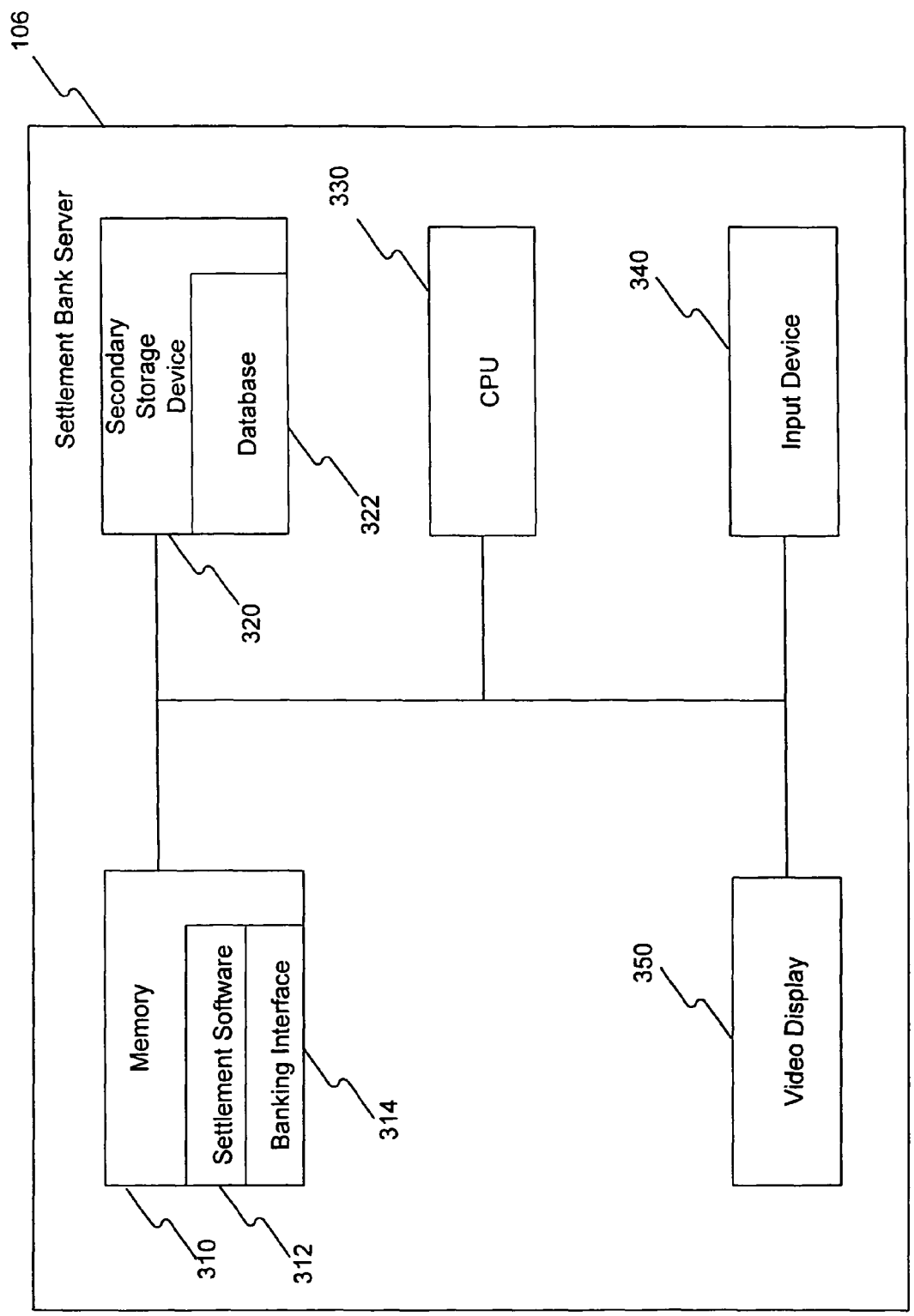
FIG. 3 depicts a more detailed diagram of the settlement bank server depicted in FIG. 1.

As shown in FIG. 3, settlement bank server 106 includes a memory 310, a secondary storage device 320, a CPU 330, an input device 340, and a video display 350. Memory 310 includes settlement software 312 and a banking interface 314. Settlement software 312 dispatches funds to an account associated with the supplier in supplier bank 110 and debits funds from an account associated with the customer in customer bank 108. Settlement software 312 may communicate with computers 102, 104 and banks 108, 110 using banking interface 314. A banking interface is a payment gateway for a bank.

Invoiceless Trading Process

Figure 4:
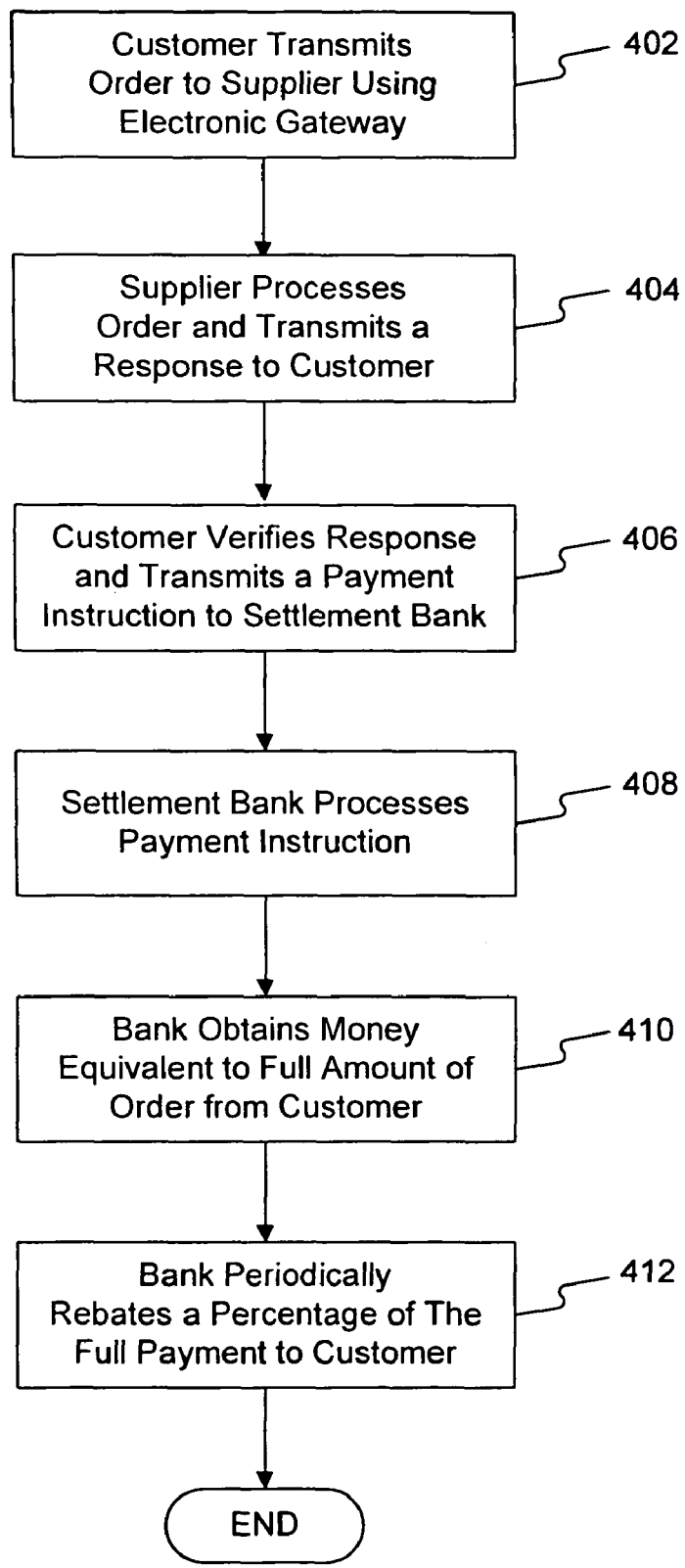
FIG. 4 depicts a flow chart of the steps performed by the invoiceless trading system consistent with the principles of the present invention.

FIG. 4 depicts a flow chart of the steps performed by invoiceless trading system 100 when providing invoiceless trading among customers and suppliers. The first step is for a customer using customer computer 102 to transmit an order to a supplier computer 104 through electronic gateway 120 (step 402). As explained earlier, electronic gateway 120 may translate the customer's order to a format understandable by supplier computer 104 and forward the order to accounting software 262 in supplier computer 104. For example, a supplier may use a Web interface and/or email to provide access to accounting software 262, however the customer may not have email or Web capability and, instead, may have only facsimile capability. The customer may fax a purchase order to a facsimile server (not shown) in electronic gateway 120. Gateway 120 then converts the facsimile to an e-mail and forwards the e-mail to supplier computer 104. Electronic gateway 120 may also maintain a log of all orders placed by the customer in a centralized database for accounting and/or auditing purposes.

If a customer's order contains multiple products from multiple suppliers, (e.g., product A from one supplier, and product B from another supplier), then electronic gateway 120 may create and forward order messages containing appropriate products for each supplier 104.

Next, supplier computer 104 processes the order and transmits a response to customer computer 102 including the status of the order (step 404). The supplier may first send a confirmation message to customer computer 102 indicating that the order can be filled (e.g., the supplier has the product in stock). The supplier may process the order using a "scan-packing" technique. Scan-packing means first determining if the ordered products are available, and if so, scanning the barcodes of the ordered products, creating a packing slip, a delivery label and an ASN immediately prior to shipment of the products. The ASN message is sent to the customer as confirmation that the goods have been shipped, and confirmation of the contents of the shipment. The scan-packing technique ensures customer order integrity and accountability since the technique creates the bar code packing slip, delivery label as well as the ASN message.

At the time of actual shipment (e.g., UPS, Federal Express), the supplier may forward the ASN message to customer computer 102 through electronic gateway 120. Similarly to the customer order in step 402, electronic gateway 120 may transform the electronic message in a format selected by supplier 104 (e.g., e-mail, HTTP request). Electronic gateway 120 translates the ASN to a format understandable by the customer, logs the ASN, and delivers the ASN to customer computer 102.

Once customer computer 102 receives the ASN message, the customer may confirm that the contents of the ASN are identical to the order. And if so, the customer may use customer computer 102 to transmit a payment instruction to settlement software 312 located at settlement bank server 106 (step 406). The customer may use electronic gateway 120, or any other communication means, such as facsimile, to instruct bank server 106 to pay the supplier. The payment instruction may include supplier details (e.g., name, address, bank account number), amount of purchase, discounted amount, and the like. If the customer transmits the payment instruction using electronic gateway 120, electronic gateway 120 may translate the payment instruction into a format understandable by settlement bank server 106, and deliver the instruction to banking interface 314 in bank server 106. For example, if the customer transmits a payment instruction as an e-mail, and settlement bank server 106 requires an Electronic Data Interchange (EDI) format, electronic gateway 120 may translate the payment instruction to an EDI format before forwarding the message to banking interface 314. The customer may transmit the payment instruction regardless of whether or not the actual products have been received. Alternatively, the customer may transmit a payment instruction once the products have been received and/or scan-packed by the customer, or after some other prearranged event, such as issuance of a delivery tracking number by a shipping company.

Regardless of the method used to transmit the payment instruction to settlement bank server 106, once received, settlement software 312 processes the payment instruction (step 408). That is, settlement software 312 first determines the amount to discount the payment and transfers cleared funds (e.g., customer loan, direct deposit) to the supplier's deposit account located at supplier bank 110. Settlement software 312 may determine the amount to discount from the payment instruction received from the customer. To deposit the funds with supplier bank 110, settlement software 312 may use banking interface 314 to wire transfer, prepare a check, or use any other well-known banking network, such as the EDI banking network. In addition, settlement software 312 may issue a remittance advice (e.g., electronic message, facsimile, e-mail) to the supplier by transmitting a notification though electronic gateway 120 to accounting software 262 (though a user interface). If the supplier can not accept an automated remittance, settlement bank 106 may forward the remittance notice in another format, such as facsimile, or mail.

As mentioned before, the discounted payment is prearranged and may be different for each customer and supplier based on a negotiated contract. For example, a supplier may offer a large customer a higher discount, or a supplier may offer a customer that pays within a shorter period of time (e.g., 24 hours of receiving the ASN) a higher discount. Settlement bank server 106 may obtain cleared funds from the customer by providing a loan, or direct withdrawal from the customer's bank account at customer bank 108. One skilled in the art will appreciate that other accounting-exercises between a customer and a supplier may exist, such as the customer and the supplier negotiating a price based on an immediate payment from the customer to the supplier, such that the payment includes a discount. In this case, settlement bank 106 may pay the supplier a full amount without any deduction.

After a credit period measured from the time at which settlement software 312 transfers the discounted funds to supplier bank 110 (e.g., one month), settlement software 312 debits the customer's account at customer bank 108 an amount equivalent to the face value of the payment before any discount (step 410). One skilled in the art will appreciate that other accounting exercises between settlement bank 106 and the customer may exist, such as debiting the amount equivalent to the discounted amount plus any additional bank fees (e.g., wire transfer, handling fees).

For example, if settlement software 312 directly debits the customer's bank account the full amount, a bank or an intermediary software developer may be entitled to a "facility fee" (described below), and/or a bank fee to process any supplier payment. In addition, if settlement bank 106 provides a loan to the customer, settlement bank 106 may also be entitled to an interest fee for the time the bank's funds are outstanding.

Finally, settlement bank 106 periodically (e.g., month, quarterly) rebates to the customer the amount of the discount deducted from the supplier account, less the settlement bank interest on funds for the time outstanding, plus any applicable fees (step 412).

Facility Fee

Electronic gateway 120 may contain added functionality. That is, a software supplier of business to business e-commerce solutions may add various software to electronic gateway 120, such as additional security, additional auditing and/or database functionality, or any other software to enhance financial settlements. The software supplier may request an electronic gateway 120 owner to include a facility fee for each order that uses the suppliers software in electronic gateway 120. The software supplier may license the software to the owners of electronic gateway 120, and in return for the use of the software, electronic gateway 120 may pay a license fee based on a revenue share agreement, or a set percentage based on dollars transacted.

This licensing agreement would therefore enable the software suppliers to charge a facility fee for their software.

CONCLUSION

As explained, systems consistent with the present invention overcome the shortcomings of existing trading systems by providing incentives for customers to pay suppliers within a shortened settlement period. The customer pays a reduced price and the supplier receives payment more quickly reducing the cost of financing its sales.

Although aspects of the present invention are described as being stored in memory, one skilled in the art will appreciate that these aspects may be stored on or read from other computer readable media, such as secondary storage devices, like hard disks, floppy disks, and CD-ROM; a carrier wave received from a network, such as the Internet; or other forms of ROM or RAM. Additionally, although specific components and programs of computers 102, 104 and various bank servers have been described, one skilled in the art will appreciate that these may contain additional or different components or programs.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, other discounts, and/or incentives for the customer may apply. Moreover the described implementation includes software but the present invention may be implemented as a combination of hardware and software or in hardware alone. The invention may be implemented with both object-oriented and non-object-oriented programming systems.

I claim:

1. One or more computer-readable storage media on which is embedded one or more computer programs, said one or more computer programs implementing a method for a settlement bank to settle an order for a customer so that the customer obtains an early payment discount for the order from a supplier by paying the supplier by a funds provider via the settlement bank within a predetermined time, the one or more computer programs comprising a set of instructions for:

electrically establishing, by the settlement bank, a record of a settlement bank agreement with the customer for settling the order placed by the customer with the supplier by paying the supplier using funds provided by the funds provider, the record comprising an interest rate;

electrically receiving, by the settlement bank, a payment message from the customer to make a discounted payment to the supplier for the order on a first date using funds from the funds provider, the discounted payment being an amount equal to a cost for the order less the early payment discount, the early payment discount being based on a fiscal attribute of the customer; and after the payment message is received by the settlement bank, paying the discounted payment, using funds obtained from the funds provider, by the settlement bank to the supplier for the order by the first date, wherein after the first date, the funds provider electronically receives from the customer by a second date a negotiated payment equal to the discounted payment plus a service fee established between the customer and the funds provider and an interest amount calculated from the interest rate established between the customer and the funds provider based on a time period between the first and second dates.

2. The one or more computer readable media containing computer-executable instructions of claim 1, further comprising: the early payment discount being negotiated by the customer and the supplier based on a fiscal attribute of the customer.

3. The one or more computer readable media containing computer-executable instructions of claim 1, wherein the interest rate is negotiated based on a fiscal attribute of the customer.

4. The one or more computer readable media containing computer-executable instructions of claim 1 wherein an electronic gateway is used to communicate between the settlement bank, the supplier, the funds provider, and the customer.

5. The one or more computer readable media containing computer-executable instructions of claim 1, wherein the early payment discount is a percentage off the cost for the order.

6. The one or more computer readable media containing computer-executable instructions of claim 1, further comprising a set of instructions for receiving, by the customer, a confirmation message from the supplier indicating that the order can be filled before the supplier receives payment.

7. The one or more computer readable media containing computer-executable instructions of claim 1, wherein the first date falls within the predetermined time after the customer receives a shipping notification from the supplier.

8. The one or more computer readable media containing computer-executable instructions of claim 1, wherein the funds provider and the settlement bank are parts of a single financial institution.

9. The one or more computer readable media containing computer-executable instructions of claim 1, wherein receiving the payment message by the settlement bank occurs after a predetermined event subsequent to receipt of a shipping notification by the customer.

10. The one or more computer readable media containing computer-executable instructions of claim 1, wherein the funds provider and the settlement bank are part of the same institution.

11. The one or more computer readable media containing computer-executable instructions of claim 1, further wherein the fiscal attribute of the customer is a balance sheet of the customer.

12. The one or more computer readable media containing computer-executable instructions of claim 1, further wherein the fiscal attribute of the customer is a credit rating of the customer.

13. One or more computer-readable storage media on which is embedded one or more computer programs, said one or more computer programs implementing a method for a settlement bank to settle an order for a customer so that the customer obtains an early payment discount for the order from a supplier by paying the supplier by a funds provider via the settlement bank, the one or more computer programs comprising a set of instructions for:

electrically establishing, by the settlement bank, a record of a settlement bank agreement with the customer for settling orders placed by the customer by paying suppliers using funds provided by the funds provider, the record comprising an interest rate;

electronically receiving, by the settlement bank, a payment message from the customer to make a discounted payment to the supplier for the order on a first date using funds from the funds provider, the discounted payment being an amount equal to a cost for the order less an early payment discount agreed upon between the customer and the supplier based on the supplier receiving payment for the order within a predetermined period of time, after the payment message is received by the settlement bank, paying the discounted payment, using funds obtained from the funds provider, by the settlement bank to the supplier for the order by the first date;

wherein after the first date, the funds provider electronically receives from the customer by a second date a negotiated payment equal to the discounted payment plus a service fee and an interest amount calculated based on a time period between the first and second dates; and wherein the interest amount is related to the settlement bank agreement.

14. The one or more computer readable media containing computer-executable instructions of claim 13, further comprising a set of instructions for negotiating, by the customer and the supplier, the early payment discount based on a fiscal attribute of the customer.

15. The one or more computer readable media containing computer-executable instructions of claim 13, wherein the interest rate is established by the customer and the funds provider based on a fiscal attribute of the customer.

16. The one or more computer readable media containing computer-executable instructions of claim 13 wherein an electronic gateway is used to communicate between the settlement bank, the supplier, the funds provider, and the customer.

17. The one or more computer readable media containing computer-executable instructions of claim 13, wherein the early payment discount is a percentage off the cost for the order.

18. The one or more computer readable media containing computer-executable instructions of claim 13, further comprising a set of instructions for sending a confirmation message from the supplier to the customer indicating that the order can be filled before the supplier receives payment.

19. The one or more computer readable media containing computer-executable instructions of claim 13, wherein the funds provider and the settlement bank are parts of a single financial institution.

20. The one or more computer readable media containing computer-executable instructions of claim 13, wherein the payment message is received by the settlement bank after a predetermined event subsequent to receipt of a shipping notification by the customer.

21. The one or more computer readable media containing computer-executable instructions of claim 13, wherein the funds provider and the settlement bank are part of the same institution.

22. The one or more computer readable media containing computer-executable instructions of claim 15, wherein the fiscal attribute of the customer is a balance sheet of the customer.

23. The one or more computer readable media containing computer-executable instructions of claim 15, wherein the fiscal attribute of the customer is a credit rating of the customer.

* * * * *

UNITED STATES PATENT AND TRADEMARK OFFICE
CERTIFICATE OF CORRECTION

PATENT NO.         : 7,716,130 B2                         Page 1 of 1
APPLICATION NO.    : 11/653306
DATED              : May 11, 2010
INVENTOR(S)        : William James Duncan It is certified that error appears in the above-identified patent and that said Letters Patent is hereby corrected as shown below:

Column 9, Claim 1, Line 3, please correct "electrically" to --electronically--.

Column 9, Claim 1, Line 9, please correct "electrically" to --electronically--.

Column 10, Claim 13, Line 22, please correct "electrically" to --electronically--.

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,716,130 B2 | Page 1 of 1 |
| APPLICATION NO. | : 11/653306 | |
| DATED | : May 11, 2010 | |
| INVENTOR(S) | : William James Duncan | |

It is certified that error appears in the above-identified patent and that said Letters Patent is hereby corrected as shown below:

In Column 1 on the Cover Page, add:

(30) Foreign Application Priority Data

May 3, 1999    (AU)    ........................PQ0102

Signed and Sealed this
First Day of January, 2013

David J. Kappos
*Director of the United States Patent and Trademark Office*